UNITED STATES PATENT OFFICE.

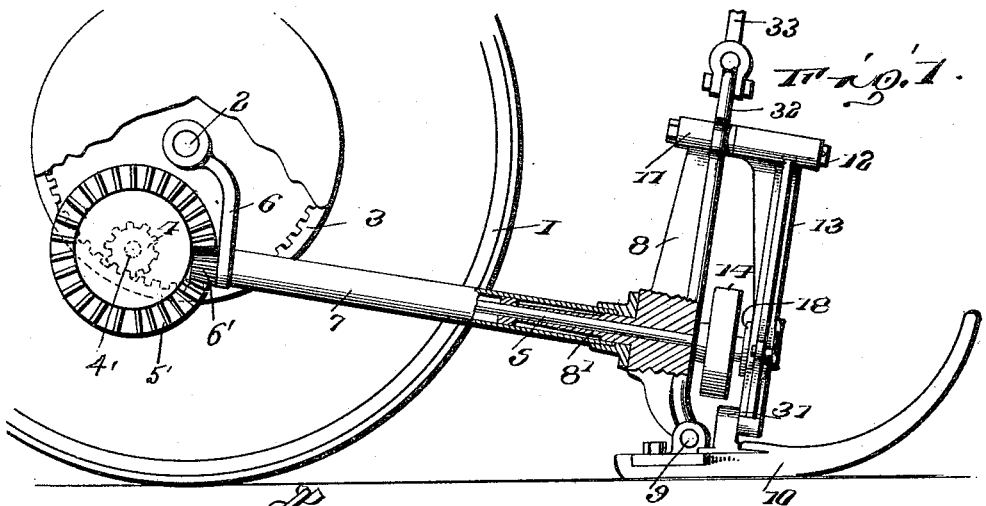
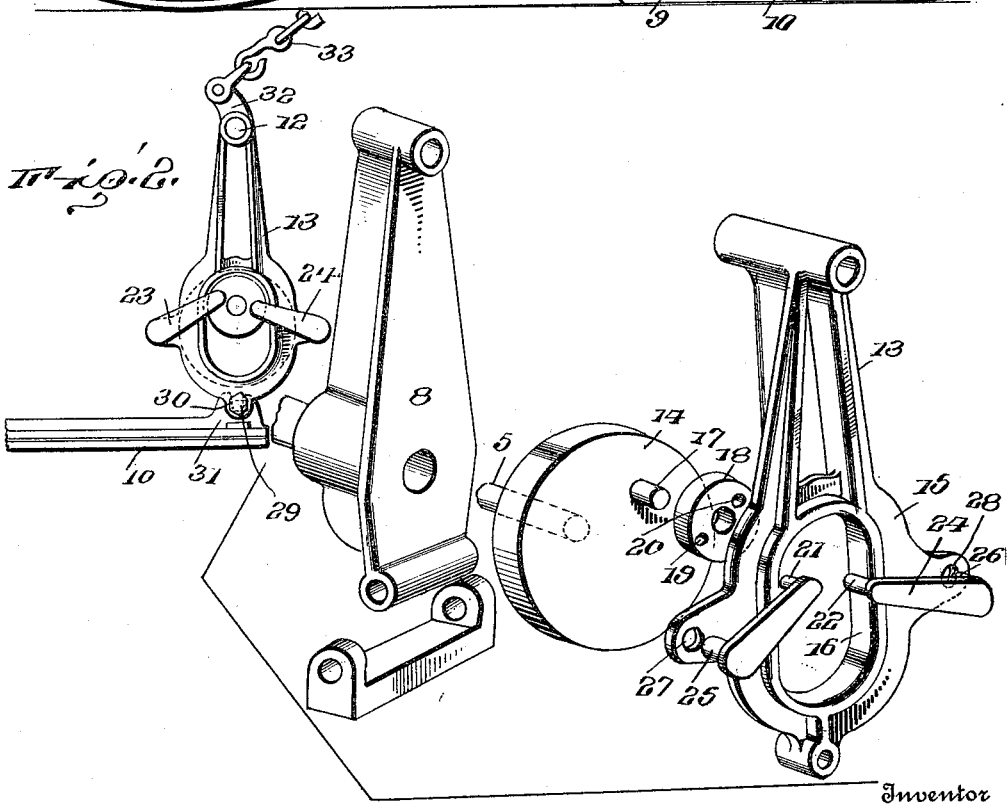

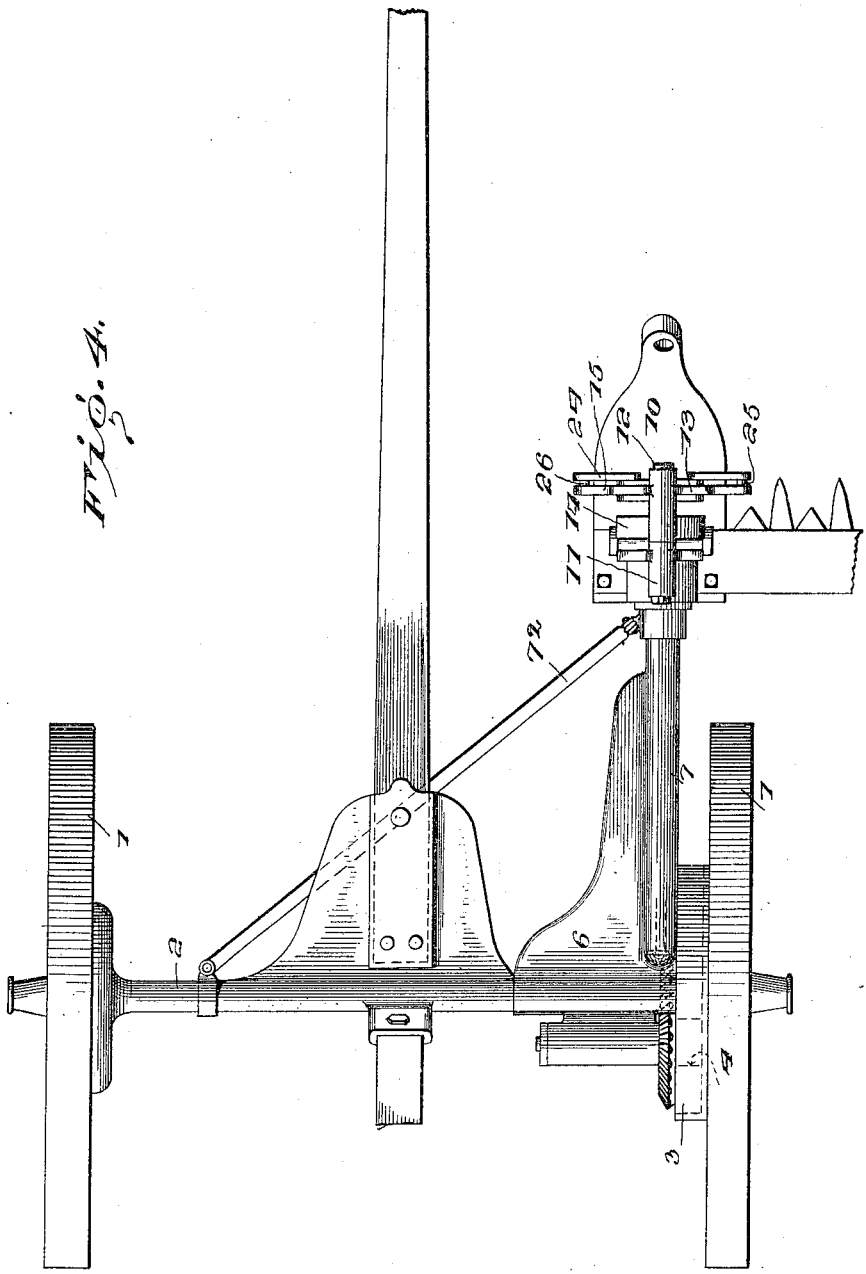

CHARLES D. CARTER, OF SPRING ARBOR, MICHIGAN.

MOWER.

1,129,640.  Specification of Letters Patent.  Patented Feb. 23, 1915.

Application filed November 28, 1911. Serial No. 662,889.

*To all whom it may concern:*

Be it known that I, CHARLES D. CARTER, a citizen of the United States, residing at Spring Arbor, in the county of Jackson and State of Michigan, have invented certain new and useful Improvements in Mowers, of which the following is a specification, reference being had therein to the accompanying drawing.

My invention relates to improvements in mowers, and pertains more particularly to the mechanism for reciprocating the cutter bar.

The object of my invention is to provide a mechanism for reciprocating a cutter bar of a mower in which the power is more directly applied and to dispense with the pitman across the front of the machine. My mechanism for reciprocating the cutter bar also transmits a more even motion to the cutter bar and also dispenses with the usual gearing, thus reducing the friction.

Another object of my invention is to provide a simple, cheap and more effective mechanism of this character having certain details of structure hereinafter more fully set forth.

In the accompanying drawing—Figure 1 is a side elevation of the lower part of a mower showing the friction wheel and the gearing connected thereto for rotating the shaft to which my improved mechanism is attached. Fig. 2 is an end view of the cutter bar reciprocating mechanism looking in the direction of the arrow in Fig. 1. Fig. 3 is an enlarged detached perspective view of the several parts forming the reciprocating mechanism. Fig. 4 is a top plan view of a mower embodying my invention.

Referring now to the drawings, 1 represents the traction wheel of my improved mower mounted on the axle 2. This wheel may be keyed or otherwise secured on the shaft and is provided with an enlarged internal gear 3, meshing with a pinion 4, carried by a shaft 4'. Pivotally mounted on the axle 2 is a bracket 6, which carries at its lower end a forwardly extending tube 7, through which the shaft 5 passes. The shaft 4' is provided with a beveled gear 5' meshing with a pinion 6' carried by the shaft 5. The forward end of the tube 7 has rigidly secured thereto a sleeve to which is secured a brace 7² which is pivotally secured to the frame of the mower, and is adapted to rock with the tube 7 as the member 6 swings upon the axle 2 of the mower. The arm 6, tube 7 and brace 7' form the finger bar carrying frame. Within the outer end of the tube 7 is rotatably mounted a sleeve 8', which carries at its outer end an arm 8 and, as shown, the arm is carried by the tube, yet it is free to oscillate.

The lower end of the arm 8 has pivotally connected thereto at 9, the finger bar 10 of the mower. This enables the finger bar to be readily rocked upon the arm 8 and the mechanism for operating the said finger bar will not be shown, as this forms no part of the present invention.

The upper end of the arm 8, is provided with a transverse bearing 11, in which is mounted a shaft 12, and loosely mounted upon said shaft is a downwardly disposed member 13. Said member 13, as shown in Fig. 1 of the drawing, is spaced some distance from the vertically disposed arm 8 and carried by the shaft 5, between said arms is a disk 14, the said disk being rigidly secured to the shaft and rotated thereby. The downwardly disposed member 13, is provided at a point slightly below the center with an enlarged portion 15 having an elongated horizontal opening 16, said opening being directly opposite the shaft 5. The disk 14 is provided with a wrist-pin 17, upon which is loosely mounted a compensating disk 18. This compensating disk 18 is carried by the wrist-pin and normally within the elongated horizontal opening 16 of the downwardly disposed arm 13.

The compensating disk 18 is provided with transverse openings 19 and 20 on the opposite sides of the wrist pin 17. Fitting within the openings 19 and 20 in the compensating disk 18 are pintles 21 and 22, secured to the links 23 and 24. The outer ends of the links 23 and 24 are provided with inwardly extending pintles 25 and 26, which extend within openings 27 and 28 in the outer edge of the downwardly disposed member 13.

The lower end of the downwardly extending arm 13 is provided with a pin 29, which extends into a slot 30 in the head 31, carried by the cutter bar.

The upper end of the arm 8 is provided with an extension 32 to which is secured a chain or cable 33, which leads to a lever or other operating mechanism, whereby the arm may be rocked in the tube 7 and the cutter bar raised and lowered as desired.

The operation of the machine is as follows: The shaft 5 being rotated by the gears, as heretofore described, causes the disk 14 to rotate and the compensating disk 18 being carried by the wrist-pin 17, the compensating disk is caused to travel around with the disk 14 and also to rotate upon the wrist-pin. This motion causes the links or pitmen 23 and 24 to rock back and forth and the outer ends being connected to the vertically disposed member 13 the cutter bar 30 is caused to reciprocate.

By the arrangement of the two links or pitmen 23 and 24, as shown in Fig. 2 of the drawings, the strain is at all times on both the links, and by arranging them as shown, the one that is doing the pulling is always the one nearest the level or in line with the bearing of the wrist-pin. As they both approach the level at the end of the stroke, the compensating disk turns so as to allow the ends of the link to just approach each other. In the middle of the stroke when the wheel is up or down it turns back as the distance lengthens from its center to the outer ends of the links.

Having thus described my invention, what I claim and desire to secure by Letters Patent is:

1. The combination with a mower frame and its supporting wheels, of a pivoted frame, an arm pivoted intermediate its ends to the frame, a finger bar supported by the lower end of said arm, a shaft supported by the frame, means operated by the supporting wheels for driving said shaft, an elongated member pivotally connected to the upper end of the arm, a cutter bar carried by the finger bar and pivotally connected to the said pivoted member, and means for rocking said pivoted member.

2. The combination with a mower frame and supporting wheels, a frame pivotally supported by the mower frame, a shaft rotatable in said frame, means operated by the wheels for rotating said shaft, an arm pivoted intermediate its ends to said frame, a member pivoted at its upper end to the said arm, a finger bar supported by the lower end of said arm, a cutter bar within the finger bar, a disk carried by the outer free end of the shaft, a wrist-pin carried by the disk and a compensating disk carried by the wrist-pin and passing through an elongated opening in the pivoted member.

3. The combination with a mower frame, and supporting wheels, a frame pivotally supported by the mower frame, a shaft rotatably mounted in said pivoted frame, an arm pivoted intermediate its ends to said frame, a cutter bar pivotally supported by the arm, a member pivoted at its upper end to the said pivoted arm, and having its lower end pivotally connected to the cutter-bar, a disk carried by the outer free end of the shaft adjacent the pivoted member, a wrist-pin carried by the disk, a compensating disk carried by the wrist-pin and a link connection between the compensating disk and the pivoted member, whereby the member is oscillated for reciprocating the cutter bar.

4. The combination with a mower frame and its supporting wheels, a cutter bar, a shaft driven by the supporting wheels, a pivoted member carried by the frame, a cutter-bar pivotally connected to the lower end of said member, a disk carried by the outer end of the shaft, a wrist pin carried by the disk, a compensating disk carried by the wrist-pin, and means connecting the compensating disk with the pivoted member for oscillating the same.

5. The combination with a mower frame and its supporting wheels, a pivoted arm, a cutter-bar, a shaft driven by the wheels, a member pivoted at its upper end to the arm and pivotally connected at its lower end to the cutter-bar, a disk carried by the outer free end of the shaft, a wrist-pin carried by the disk, a compensating disk loosely mounted on the wrist-pin, links pivotally connected with the compensating disk and having their outer free ends pivotally connected to the pivoted member whereby the rotation of the shaft causes the pivoted arm to oscillate and reciprocate the cutter bar.

6. The combination with a mower frame and supporting wheels, a cutter-bar, a shaft driven by the supporting wheels, a pivoted arm, a member pivoted at its upper end to the arm, and having its lower end pivotally connected to the cutter-bar, said pivoted member having a transverse elongated opening intermediate its ends, a disk carried by the outer free end of the shaft opposite the opening in the pivoted member, a wrist-pin carried by the disk and extending within the opening within the pivoted member, a compensating disk mounted on the wrist-pin within the opening of the pivoted member, links pivoted or connected to the compensating disk on opposite sides of the wrist-pin and having their free ends pivotally connected to the member, whereby the rotation of the shaft oscillates the pivoted member and reciprocates the cutter-bar.

7. The combination with a mower frame and supporting wheels, a pivoted frame supported by the mower frame, a shaft rotatably supported by the pivoted frame and driven by the wheels, a vertically disposed arm, pivotally supported by the forward end of the pivoted frame, a finger-bar pivotally connected to the lower end of said arm, a cutter-bar within the finger-bar, a member pivotally connected to the upper end of the vertically disposed arm and having its lower end pivotally connected to the cutter bar, said member having a horizontal elongated opening therein, a disk carried by the outer free end of the shaft, a wrist-pin carried by the disk and extending within the opening of the pivoted member, a compensating disk mounted upon the wrist-pin within the opening of the member, and links pivotally connected to the compensating disk on opposite sides of the wrist-pin and having their free ends pivotally connected to the said pivoted member whereby the member is oscillated and whereby the cutter-bar is reciprocated.

8. The combination with a mower frame and supporting wheels, a bracket pivotally supported by the axle of the supporting wheels, a forwardly extending tube carried by said bracket, a vertically disposed arm pivotally supported intermediate its ends at the forward end of the said tube, a finger-bar pivotally carried by the lower end of the said arm, a cutter bar within the finger bar, a driving shaft extending through the tube and driven by the supporting wheels, means operated by the outer end of the said shaft for reciprocating the cutter-bar, and means for rocking said arm in the tube, whereby the cutter bar is raised and lowered, substantially as shown and described.

9. The combination with a mower frame, and supporting wheels, a frame pivotally supported by the mower frame, an intermediately pivoted arm carried by the frame, a finger-bar pivotally connected to the lower end of said arm, a cutter-bar within the finger-bar, a member pivotally connected at its upper end to the intermediately pivoted arm, and its lower end to the cutter-bar, and means operated by the supporting wheel for rocking the member on its pivot.

10. The combination with a mower frame, and supporting wheels, a frame pivotally supported by the mower frame, an arm pivoted intermediate its ends to the frame, a finger-bar pivotally connected to the lower end of said arm, a cutter-bar within the finger-bar, a member pivotally connected at its upper end to the intermediately pivoted arm, and its lower end to the cutter-bar, and means operated by the supporting wheels and connected to the pivoted member intermediate its ends for reciprocating the cutter-bar.

In testimony whereof I hereunto affix my signature in the presence of two witnesses.

CHARLES D. CARTER.

Witnesses:
 FRANK THOMPSON,
 JOHN BRYDM.

Copies of this patent may be obtained for five cents each, by addressing the "Commissioner of Patents, Washington, D. C."